United States Patent
Yoshida et al.

(10) Patent No.: US 12,090,633 B2
(45) Date of Patent: Sep. 17, 2024

(54) ROBOT CONTROL DEVICE

(71) Applicant: FANUC CORPORATION, Yamanashi (JP)

(72) Inventors: Shigeo Yoshida, Yamanashi (JP); Takatoshi Iwayama, Yamanashi (JP); Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 235 days.

(21) Appl. No.: 17/904,701

(22) PCT Filed: Mar. 3, 2021

(86) PCT No.: PCT/JP2021/008203
§ 371 (c)(1),
(2) Date: Aug. 19, 2022

(87) PCT Pub. No.: WO2021/182243
PCT Pub. Date: Sep. 16, 2021

(65) Prior Publication Data
US 2023/0065851 A1 Mar. 2, 2023

(30) Foreign Application Priority Data
Mar. 10, 2020 (JP) .................. 2020-040840

(51) Int. Cl.
*B25J 13/08* (2006.01)
*B23K 9/12* (2006.01)
*B25J 9/16* (2006.01)

(52) U.S. Cl.
CPC ............. *B25J 13/085* (2013.01); *B23K 9/126* (2013.01); *B25J 9/1674* (2013.01)

(58) Field of Classification Search
CPC ...... B25J 13/085; B25J 9/1674; B25J 9/1628; B25J 9/163; B25J 9/1633; B25J 9/1679;
(Continued)

(56) References Cited

U.S. PATENT DOCUMENTS

2011/0089146 A1* 4/2011 Takahashi ............. B23K 11/115
219/91.2

FOREIGN PATENT DOCUMENTS

JP 2004-351510 A 12/2004
JP 2012-200755 A 10/2012
(Continued)

OTHER PUBLICATIONS

International Search Report issued in PCT/JP2021/008203; mailed May 25, 2021.

*Primary Examiner* — Abby Y Lin
*Assistant Examiner* — Esvinder Singh
(74) *Attorney, Agent, or Firm* — Studebaker & Brackett PC

(57) ABSTRACT

Provided is a robot control device that can suppress the stoppage of operations due to the detection of a contact error. The robot control device controls a robot that implements welding in association with contact with a to-be-welded object, said device comprising: an action stoppage unit that stops the action of the robot if detected that the robot has been subjected to an external force equal to or greater than a threshold; an instructing unit that instructs a welding power supply device to start welding; and a detection sensitivity adjustment unit that lowers the sensitivity at which as external force is detected at the action stoppage unit during a period of time from the point in time at which the instructing unit instructs the welding power supply device to start welding until a prescribed wait time has elapsed.

8 Claims, 3 Drawing Sheets

(58) Field of Classification Search
CPC ...... B25J 11/005; B23K 9/126; B23K 11/255; B23K 11/253; B23K 26/0884; B23K 11/314; G05B 2219/45104; G05B 2219/39321

See application file for complete search history.

(56) References Cited

FOREIGN PATENT DOCUMENTS

| | | |
|---|---|---|
| JP | 2016-117141 A | 6/2016 |
| JP | 2017-100169 A | 6/2017 |

* cited by examiner

ROBOT CONTROL DEVICE

TECHNICAL FIELD

The present invention relates to a robot control device that controls operation of a robot.

BACKGROUND ART

In recent years, in the field of manufacturing industries, a so-called collaborative robot (hereinafter also referred to as a "robot") capable of performing various types of processes in cooperation with a person without the need for a safety fence has become popular. Many robots of this type have a contact stop function of stopping operation for safety when a certain level of external force or more is detected. (see, e.g., Patent Document 1).

Patent Document 1: Japanese Unexamined Patent Application, Publication No. 2016-117141

DISCLOSURE OF THE INVENTION

Problems to be Solved by the Invention

A robot for arc welding sometimes receives external force when operation necessary for an arc welding process is executed. External force generated at the start of arc welding includes external force that is less likely to cause a safety problem in a robot. For example, such external force includes reactive force received from a workpiece due to contact of a welding wire during later-described retry operation while the wire is being continuously supplied in a state in which arc discharge is not smoothly, generated. However, even if there is no safety problem, a robot receives a certain level of external force or more, and for this reason, a process is sometimes stopped by activation of the contact stop function. Hereinafter, detection of a certain level of external force or more due to contact considered to cause no safety problem will be referred to as "erroneous contact detection".

An object of the present invention is to provide a robot control device capable of reducing stoppage of a process due to the erroneous contact detection.

Means for Solving the Problems

One aspect of the present disclosure is a robot control device for controlling a robot that performs welding involving contact with a welding target, the robot control device including an operation stop unit that stops operation of the robot in a case where it is detected that the robot has received an external force of a threshold or more, an instruction unit that instructs a welding power supply device to start welding, and a detection sensitivity adjustment unit that decreases the sensitivity of detecting the external force in the operation stop unit from the point in time at which the instruction unit instructs the welding power supply device to start welding until a predetermined standby time has elapsed.

Effects of the Invention

According to the present invention, the robot control device capable of reducing stoppage of the process due to the erroneous contact detection can be provided.

PREFERRED MODE FOR CARRYING OUT THE INVENTION

Hereinafter, an embodiment of a robot control device according to the present invention will be described. Any of the drawings attached to the present specification shows a schematic diagram, and considering understandability etc., shows the shapes, scales, vertical and horizontal dimensional ratios, etc. of components changed or exaggerated as compared to actual shapes, scales, vertical and horizontal dimensional ratios, etc.

First Embodiment

Figure 1:
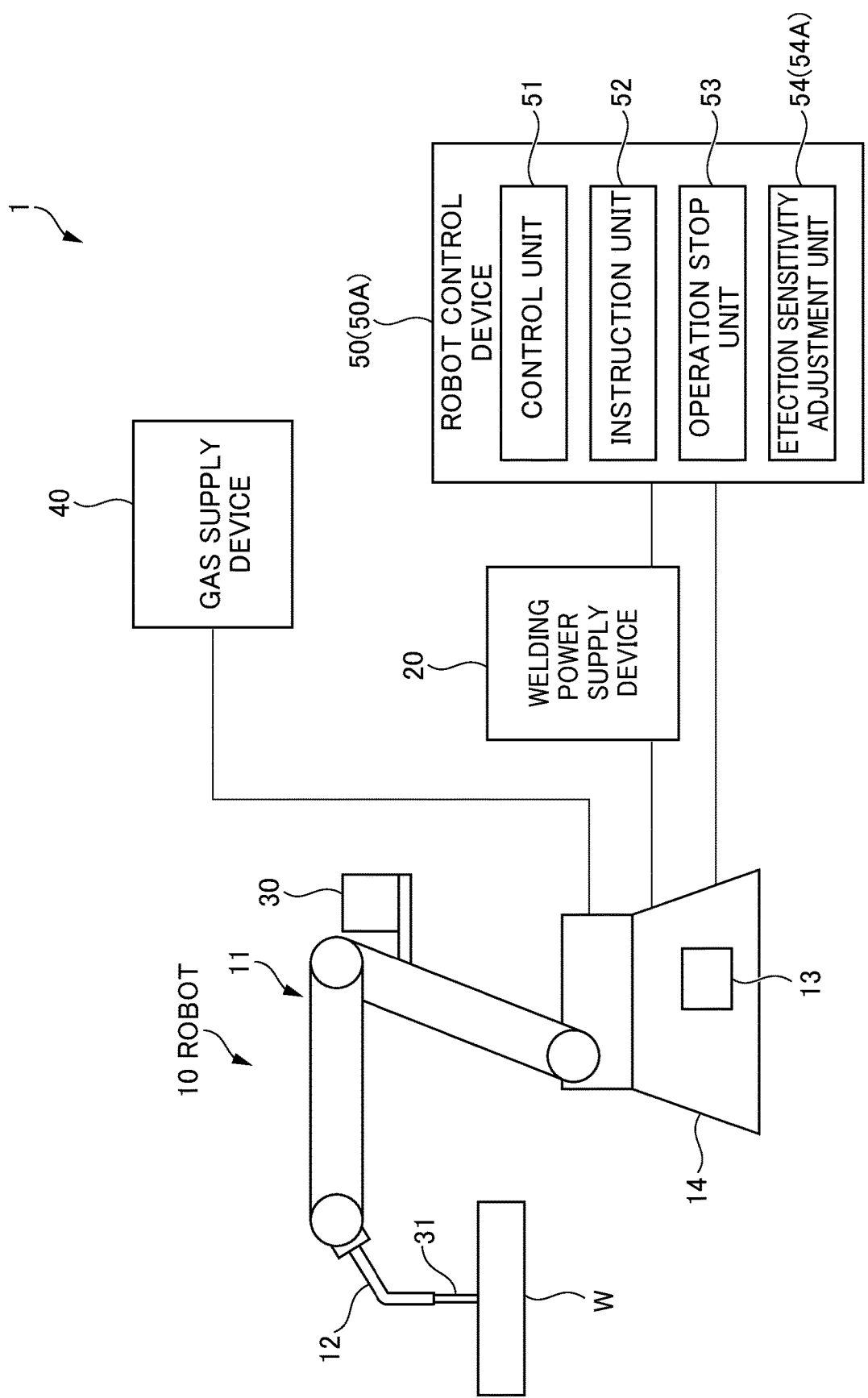
FIG. 1 is an entire configuration diagram of a robot system including a robot control device 50 according to a first embodiment.

FIG. 1 is an entire configuration diagram of a robot system 1 including a robot control device 50 of a first embodiment. FIG. 1 schematically shows the entire configuration of the robot system 1, and the arrangements, shapes, connection forms, etc. of components are different from those of an actual system. As shown in FIG. 1, the robot system 1 includes a robot 10, a welding power supply device 20, a welding wire supply device 30, a gas supply device 40, and the robot control device 50.

The robot 10 is an arc welding robot (a collaborative robot) that performs arc welding for a workpiece W. Operation of the robot 10 is controlled by the robot control device 50 (described later).

In the present embodiment, a structure including a plurality of arms and joints the robot 10 will be collectively referred to as an "arm portion 11". A welding torch 12 that generates arc discharge between the welding torch 12 and the workpiece (a welding target) W is provided at a tip end of the arm portion 11. A welding wire 31 is supplied from the welding wire supply device 30 (described later) to the welding torch 12, and gas is supplied from the gas supply device 40 (described later) to the welding torch 12.

In addition, current and voltage for arc welding are supplied from the welding power supply device 20 (described later) to the welding torch 12. The welding power supply device 20 (described later) determines, based on output values of the current and voltage supplied to the welding torch 12, whether or not arc discharge has been generated. In a case where arc discharge has been generated, the welding power supply device 20 transmits a notification of generation of arc discharge to the robot control device 50.

The robot 10 includes a force detection unit 13. The force detection unit 13 is a device that detects external force (force or torque) acting on the robot 10. As shown in FIG. 1, the force detection unit 13 is provided at a base 14 supporting the arm portion 11. External force acting on the base 14 is equivalent to the external force acting on the robot 10. The force detection unit 13 transmits, as a detection value, the magnitude of the external force acting on the robot 10 to the robot control device 50.

The welding power supply device 20 is a device that supplies the current and voltage for arc welding to the welding torch 12 (the robot 10) based on a welding start signal notified from the robot control device 50. The output values of the current and voltage supplied from the welding power supply device 20 to the welding torch 12 are set based on command values notified from the robot control device

50. Moreover, the welding power supply device 20 has the function of detecting generation of arc discharge between the welding torch 12 and the workpiece W by an internal circuit and notifying the robot control device 50 that arc welding start processing is in progress.

The welding wire supply device 30 is a device that supplies the welding wire 31 to the welding torch 12 based on an instruction from the robot control device 50. The instruction for supplying the welding wire 31 to the welding torch 12 transmitted from the robot control device 50 (an instruction unit 52) to the welding wire supply device 30 via the welding power supply device 20. The welding wire 31 is supplied from a wire supply source (not shown) such as a wire drum to the welding wire supply device 30. The amount of welding wire 31 to be supplied from the welding wire supply device 30 to the welding torch 12 is set based on a command value notified from the robot control device 50.

The gas supply device 40 is a device that supplies gas (shielding gas) to the welding torch 12 based on an instruction from the robot control device 50. The instruction for supplying gas to the welding torch 12 is transmitted from the robot control device 50 (the instruction unit 52) to the gas supply device 40 via the welding power supply device 20.

The robot control device 50 includes a processor unit having a processor, a ROM, a RAM, etc. The processor (CPU) reads and executes a system program, an application program (e.g., a later-described erroneous contact detection reduction program), etc. stored in ROM, thereby implementing the functions of later-described units in cooperation with each piece of hardware. The RAM stores, as data to be used for arithmetic processing of the processor, position information, a command value, a detection value, and a threshold, for example. As shown in FIG. 1, the robot control device 50 includes a control unit 51, the instruction unit 52, an operation stop unit 53, and a detection sensitivity adjustment unit 54.

The control unit 51 controls operation of the arm portion 11 of the robot 10 for arc welding in an integrated manner. In the robot 10, a servomotor (not shown) attached to each portion of the arm portion 11 is controlled based on a command from the control unit 51. By such control, the welding torch 12 provided at the tip end of the arm portion 11 can move to a welding start position on the workpiece W or move at a predetermined speed in a predetermined direction along a surface of the workpiece W.

The instruction unit 52 provides, as the arc welding start processing, the following instructions or notifications (A) to (D) to each device. The instructions or notifications (A) to (D) are provided in this order in the arc welding start processing. Note that (A) to (D) are one example of main instructions or notifications provided in the arc welding start processing and are not limited to above.

(A) At the start of arc welding, a gas supply instruction is provided to the gas supply device 40 via the welding power supply device 20.

(B) The command value regarding the amount of welding wire 31 to be supplied is notified to the welding wire supply device 30.

(C) At the start of arc welding, the command values of the current, the voltage, or a command value of the wire supply, speed is notified to the welding power supply device 20.

(D) At the start of arc welding, the welding start signal is notified to the welding power supply device 20. Note that some or all of the above-described instructions and notifications provided by the instruction unit 52 may be provided by the control unit 51.

When detecting that the robot 10 has received an external force of a threshold or more, the operation stop unit 53 stops operation of the robot 10 by a contact stop function. Specifically, the operation stop unit 53 compares the detection value (the magnitude of the external force received by the robot 10) transmitted from the force detection unit 13 with the preset threshold, and in a case where the detection value exceeds the threshold, determines that the robot 10 has received the external force of the threshold or more and stops operation of the robot 10. Note that "determination" that she robot 10 has received the external force of the threshold or more means that the operation stop unit 53 "detects" that the robot 10 has received the external force of the threshold or more. In the operation stop unit 53, the above-described threshold is changed according to a sensitivity decrease instruction transmitted from the detection sensitivity adjustment unit 54 (described later). After the sensitivity decrease instruction has been transmitted from the detection sensitivity adjustment unit 54, the operation stop unit 53 executes the control of changing the threshold from a normal value to a preset value. In addition, after a sensitivity decrease cancellation instruction has been transmitted from the detection sensitivity adjustment unit 54, the operation stop unit 53 executes the control of returning the threshold to the normal value.

The detection sensitivity adjustment unit 54 executes the control of decreasing the sensitivity of detecting the external force in the operation stop unit 53 from the point in time at which the instruction unit 52 instructs the welding power supply device 20 to start arc welding until a predetermined standby time has elapsed. Specifically, the detection sensitivity adjustment unit 54 transmits the sensitivity decrease instruction to the operation stop unit 53 at the point in time at which the instruction unit 52 instructs the welding power supply device 20 to start arc welding. In addition, the detection sensitivity adjustment unit 54 transmits the sensitivity decrease cancellation instruction to the operation stop unit 53 after the predetermined standby time has elapsed.

In this manner, the sensitivity of detecting the external force in the operation stop unit 53 can be decreased from the point in time act which the instruction unit 52 instructs the welding power supply device 20 to start arc welding until the predetermined standby time has elapsed. Note that "decreasing the sensitivity of detecting the external force" means that the threshold to be compared with the detection value is increased as compared to the normal value in the operation stop unit 53. The threshold is increased as compared to the normal value such that the operation stop unit 53 is less likely to determine that the external force has been received when the robot 10 executes various types of operation during the arc welding start processing, for example.

In the detection sensitivity adjustment unit 54, the "predetermined standby time" indicates a period of time from the point in time at which the instruction unit 52 instructs the welding power supply device 20 to start arc welding until the point in time at which the detection sensitivity adjustment unit 54 recognizes generation of arc discharge based on a notification from the welding power supply device 20. In the detection sensitivity adjustment unit 54, "the point in time at which the instruction unit 52 instructs the welding power supply device 20 to start arc welding" indicates any one of the above-described instructions or notifications (A) to (D) provided by the instruction unit 52 as the arc welding start processing. In the present embodiment, the point in time at which "at the start of arc welding, the welding start signal is notified to the welding power supply device 20" as described above in (D) will be described as the point in time at which the instruction unit 52 instructs the welding power supply device 20 to start arc welding.

In addition, in the detection sensitivity adjustment unit 54, "the point in time at which the detection sensitivity adjustment unit 54 recognizes generation of arc discharge based on a notification from the welding power supply device 20" is either of the point in time at which the detection sensitivity adjustment unit 54 receives the notification of generation of arc discharge from the welding power supply device 20 or the point in time at which the detection sensitivity adjustment unit 54 determines, based on the output values of the current and voltage supplied from the welding power supply device 20 to the welding torch 12 or the output value of the wire supply speed, that arc discharge has been generated.

Figure 2:
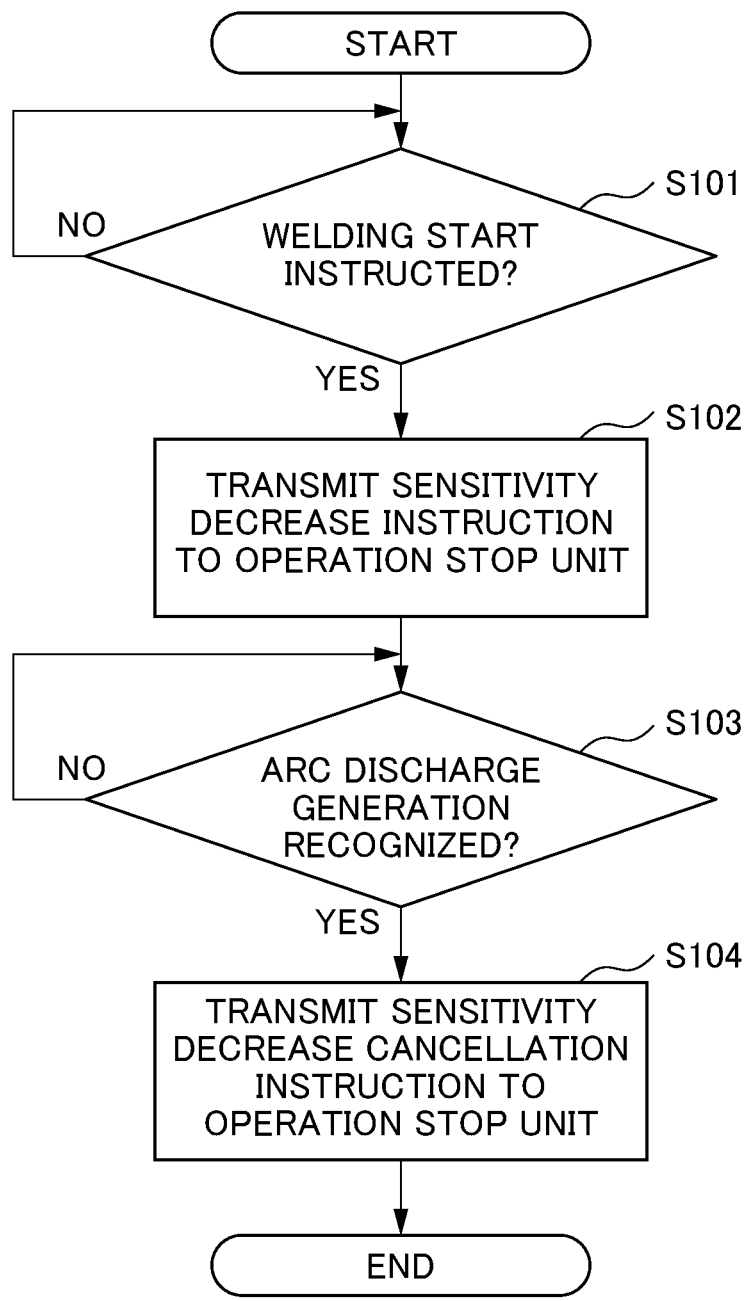
FIG. 2 is a flowchart showing the steps of the processing of an erroneous contact detection reduction program executed in the robot control device 50.

Next, a specific example of the processing of reducing stoppage of the robot 10 due to the erroneous contact detection in the robot control device 50 of the present embodiment will be described. FIG. 2 is a flowchart showing the steps of the processing of the erroneous contact detection reduction program executed in the robot control device 50. In Step S101 shown in FIG. 2, the detection sensitivity adjustment unit 54 (the robot control device 50) determines whether or not the instruction unit 52 has instructed the welding power supply device 20 to start welding. In the present embodiment, the detection sensitivity adjustment unit 54 determines that the instruction unit 52 has instructed the welding power supply device 20 to start welding in a case where the instruction unit 52 notifies the welding power supply device 20 of the welding start signal at the start of arc welding.

In a case where the detection sensitivity adjustment unit 54 determines, in Step S101, that the instruction unit 52 has instructed the welding power supply device 20 to start welding, the processing proceeds to Step S102. On the other hand, in a case where the detection sensitivity adjustment unit 54 determines, in Step S101, that the instruction unit 52 has not instructed the welding power supply device 20 to start welding, the processing returns to Step S101.

In Step S102 (Step S101: YES), the detection sensitivity adjustment unit 54 transmits the sensitivity decrease instruction to the operation stop unit 53. After having received the sensitivity decrease instruction, the operation stop unit 53 changes the level of the threshold to the preset value. In this manner, the operation stop unit 53 is less likely to determine that the external force has been received when the robot 10 executes various types of operation during the arc welding start processing, for example. Thus, the contact stop function is less likely to be activated at the start of arc welding.

In Step S103, the detection sensitivity adjustment unit 54 determines whether or not the detection sensitivity adjustment unit 54 has recognized generation of arc discharge. In the present embodiment, the detection sensitivity adjustment unit 54 determines that the detection sensitivity adjustment unit 54 has recognized generation of arc discharge in a case where the detection sensitivity adjustment unit 54 has received the notification of generation or arc discharge from the welding power supply device 20.

In a case where the detection sensitivity adjustment unit 54 determines, in Step S103, that the detection sensitivity adjustment unit 54 has recognized generation of arc discharge, the processing proceeds to Step S104. On the other hand, in a case where the detection sensitivity adjustment unit 54 determines, in Step S103, that the detection sensitivity adjustment unit 54 does not recognize generation of arc discharge, the processing returns to Step S103.

In Step S104 (Step S103: YES), the detection sensitivity adjustment unit 54 transmits the sensitivity decrease cancellation instruction to the operation stop unit 53. After having received the sensitivity decrease cancellation instruction, the operation stop unit 53 returns the threshold to the normal value. In this manner, when the robot 10 receives a certain level of external force or more, the contact stop function of the operation stop unit 53 is normally activated, and operation of the robot 10 is stopped. After the processing in Step S104 has been executed, the processing of the present flowchart ends.

According to the robot control device 50 of the first embodiment as described above, even in a case where the retry operation of prompting generation of arc discharge is performed at the start of welding, the contact stop function of the operation stop unit 53 is less likely to be activated until the instruction unit 52 receives the notification or generation of arc discharge from the welding power supply device 20 after the instruction unit 52 has instructed the welding power supply device 20 to start welding. Thus, according to the robot control device 50 of the first embodiment, when no arc discharge is generated at the start of welding, even if the retry operation is performed, stoppage of the process due to the erroneous contact detection can be reduced.

The robot control device 50 of the first embodiment determines that the instruction for starting arc welding by the robot 10 has been provided to the welding power supply device 20 at the point in time at which the instruction unit 52 notifies the welding power supply device 20 of the welding start signal at the start of arc, welding, and therefore, the start of welding by the robot 10 can be more accurately determined. Moreover, the robot control device 50 of the first embodiment determines that the instruction unit 52 has recognized generation of arc discharge at the point in time at which the instruction unit 52 receives the notification of generation of arc discharge from the welding power supply device 20, and therefore, generation of arc discharge between the welding torch 12 and the workpiece W can be more accurately determined. Thus, according to the robot control device 50 of the first embodiment, an interval in which the contact stop function of the robot 10 is less likely to be activated can be more accurately set. Moreover, the interval in which the contact stop function of the robot 10 is less likely to be activated is limited to a period during the arc welding start processing, and therefore, can be a minimum required interval.

Second Embodiment

A robot control device 50A of a second embodiment is different from that of the first embodiment in the function of a detection sensitivity adjustment unit 54A. Other configurations in the robot control device 50A of the second embodiment are the same as those of the first embodiment. Thus, the second embodiment will be described with reference to FIG. 1 of the first embodiment. Moreover, in description of the second embodiment, the same reference numerals as those of the first embodiment will be used to represent members etc. equivalent to those of the first embodiment, and overlapping description thereof will be omitted.

The detection sensitivity adjustment unit 54A (the robot control device 50A) of the second embodiment decreases the sensitivity of detecting external force in an operation stop unit 53 until a robot 10 moves in a welding progress direction by a preset distance from the position (a later-described welding start position P1) at which arc welding by the robot 10 starts. The detection sensitivity adjustment unit 54A shares, with a control unit 51, data on the position of starting arc welding by the robot 10 (a welding torch 12), the welding progress direction, the welding distance, etc., and therefore, can recognize the position of starting arc welding by the robot 10, the arc welding progress direction, and the welding distance.

In the second embodiment, the detection sensitivity adjustment unit 54A transmits a sensitivity decrease instruction to the operation stop unit 53 at the point in time at which the robot 10 reaches the arc welding start position. Moreover, the detection sensitivity adjustment unit 54A transmits a sensitivity decrease cancellation instruction to the operation stop unit 53 at the point in time at which the robot 10 reaches the predetermined position after having moved by the preset distance or the point in time at which the robot 10 recognizes generation of arc discharge.

Figure 3:
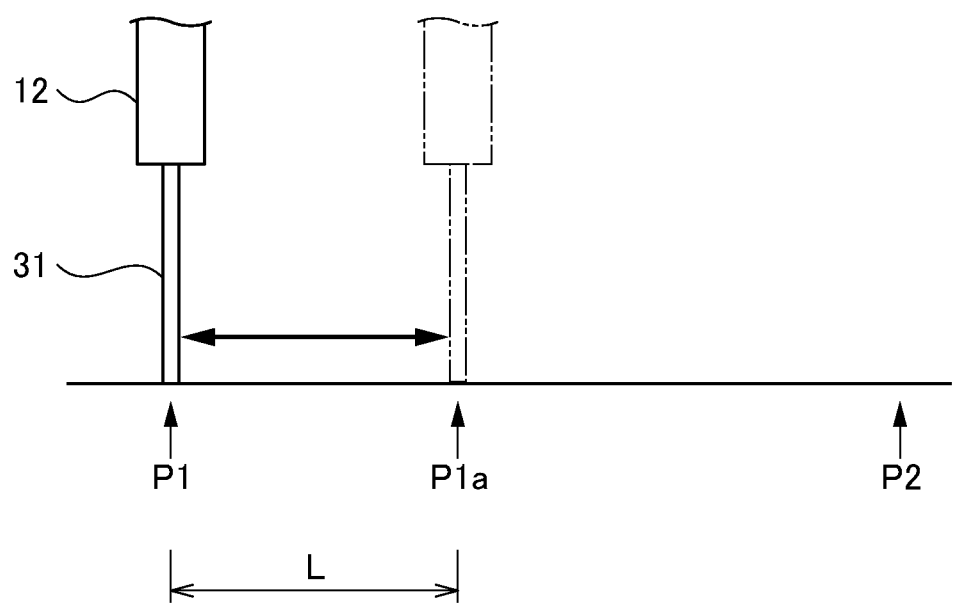
FIG. 3 is a conceptual diagram showing retry operation by a scratch start function.

One example of retry operation executed in a case where no arc discharge is generated will be described herein. FIG. 3 is a conceptual diagram showing the retry operation by a scratch start function. The scratch start function is the function of moving, in a case where no arc discharge is generated at the start of arc welding, a welding wire 31 such that a tip end thereof scratches a surface of a workpiece W, thereby prompting generation of arc discharge.

With the scratch start function, the operation of moving the welding torch 12 in the direction of an arrow to a position P1a apart from the welding start position P1 by a predetermined distance L is repeated in a state in which the tip end of the welding wire 31 is pressed against the surface of the workpiece W until arc discharge is generated, as shown in FIG. 3. The position P1a is set to a position at a shorter distance L than a distance from the welding start position P1 to a welding end position P2. In a case where arc discharge is generated while the welding torch 12 is moving so as to scratch the surface of the workpiece W, the robot 10 returns the welding torch 12 to the welding start position P1 once, and from such a position, arc welding is executed for an original welding interval from P1 to P2.

Even in a case where the welding torch 12 moves so as to scratch the surface of the workpiece W by the scratch start function, a certain level of external force or more on the robot 10 is sometimes detected when the welding wire 31 is delivered out of the welding torch 12. For this reason, even in a case where the scratch start function is performed, a process is sometimes stopped by a contact stop function due to the certain level of external force or more received by the robot.

The detection sensitivity adjustment unit 54A of the second embodiment decreases the sensitivity of detecting the external force in the operation stop unit 53 until the robot 10 moves in the welding progress direction by the preset distance from the position P1 at which welding by the robot 10 starts. The "preset distance" described herein is set to a distance longer than (or equal to) that between P1 and P1a and shorter than that between P1 and P2 as shown in FIG. 3. In a case where the scratch start function is performed, the welding torch 12 (the robot 10) moves at a welding speed, but a movement speed in arc welding is not so fast (e.g., about 2 m/min). Normally, a movement distance set for the scratch start function is no longer than about 20 mm, and for this reason, it is assumed that such a movement distance is less likely to cause a safety problem even when the contact stop function is less likely to be activated.

According to the robot control device 50A of the second embodiment, even in a case where the scratch start function is performed as the retry operation, the contact stop function of the operation stop unit 53 is less likely to be activated until the robot 10 moves in the welding progress direction by the preset distance from the welding start position P1. Thus, according to the robot control device 50A of the second embodiment, in a case where no arc discharge is generated at the start of welding, even if the retry operation is performed, stoppage of the process due to erroneous contact detection can be reduced.

Moreover, in the robot control device 50 of the first embodiment, in a case where the detection sensitivity adjustment unit 54 erroneously recognizes the point in time of generation of arc discharge, there is a probability that a state in which the contact stop function is less likely to be activated lasts longer than expected, for example. On the other hand, in the robot control device 50A of the second embodiment, the contact stop function is normally activated after the robot 10 has moved by the preset distance, and therefore, safety can be further improved.

The first and second embodiments (hereinafter also merely referred to as "embodiments") of the present disclosure have been described above, but the present disclosure is not limited to the above-described embodiments. Various modifications and changes can be made as in later-described variations, and are also included in the technical scope of the present disclosure. Moreover, the advantageous effects described in the embodiments merely include the list of those most suitable in the present disclosure, and the advantageous effects of the present disclosure are not limited to those described in the embodiments. Note that the above-described embodiments and the later-described variations may be used in combination as necessary, but detailed description thereof will be omitted.

(Variations)

In the embodiments, the examples where the sensitivity of detecting the external force is decreased (the threshold is increased) such that the contact stop function of the operation stop unit 53 is less likely to be activated have been described, but it may be configured such that the contact stop function is not activated. For example, in the operation stop unit 53, detection of the external force (the force or the torque) by the force detection unit 13 provided at the robot 10 may be taken as invalid.

In the embodiments, the examples where the point in time at which the instruction unit 52 instructs the welding power supply device 20 to start arc welding is any one of the above-described instructions or notifications to (D) previously described. Alternatively, the point in time at which the instruction unit 52 instructs the welding power supply device 20 to start arc welding may include a point in time obtained by addition of a correction time to or subtraction of the correction time from any one of the instructions or notifications (A) to (D). That is, the point in time at which the instruction unit 52 instructs the welding power supply device 20 to start arc welding may be a point in time before or after any one of the instructions or notifications (A) to (D). The correction time is, for example, ±0.5 seconds.

In the embodiments, examples have been described, in which the point in time at which the instruction unit 52 recognizes generation of arc discharge based on the notification from the welding power supply device 20 is either of the point in time at which the instruction unit 52 receives the notification of generation of arc discharge from the welding power supply device 20 or the point in time at which the detection sensitivity adjustment unit 54 determines, based on the output values of the current and voltage supplied from the welding power supply device 20 to the welding torch 12, that arc discharge has been generated. Alternatively, a point in time obtained by addition of a correction time to any of the above-described points in time may be taken as the point in time at which the robot 10 recognizes generation of arc discharge based on the notification from the welding power supply device 20. The correction time is, for example, ±1 second.

The function of the detection sensitivity adjustment unit 54A of the second embodiment may be combined with the function of the detection sensitivity adjustment unit 54 of the first embodiment. With this configuration, even in a case where the detection sensitivity adjustment unit 54 erroneously recognizes the point in time of generation of arc discharge, the contact stop function of the operation stop unit 53 is activated after the robot 10 has moved in the welding progress direction by the preset distance from the welding start position P1, and therefore, the safety can be further improved.

EXPLANATION OF REFERENCE NUMERALS

1: Robot System, 10: Robot, 11: Arm. Portion, 12: Welding Torch, 13: Force Detection Unit, 20: Welding Power Supply Device, 30: Welding Wire Supply Device, 31: Welding Wire, 40: Gas Supply Device, 50 (50A): Robot Control Device, 51: Control Unit, 52: Instruction Unit, 53: Operation Stop Unit, 54 (54A): Detection Sensitivity Adjustment Unit

The invention claimed is:

1. A robot control device for controlling a robot that performs welding involving contact with a welding target, comprising:
　an operation stop unit that stops operation of the robot in a case where it is detected that the robot has received an external force of a threshold or more;
　an instruction unit that instructs a welding power supply device to start welding; and
　a detection sensitivity adjustment unit that decreases a sensitivity of detecting the external force in the operation stop unit from a point in time at which the instruction unit instructs the welding power supply device to start welding until a predetermined standby time has elapsed.

2. The robot control device according to claim 1, wherein the detection sensitivity adjustment unit takes, as the predetermined standby time, a period of time from the point in time at which the instruction unit instructs the welding power supply device to start welding until a point in time at which the detection sensitivity adjustment unit recognizes generation of arc discharge based on a notification from the welding power supply device.

3. The robot control device according to claim 2, wherein the detection sensitivity adjustment unit takes, as the point in time at which the instruction unit instructs the welding power supply device to start welding, any one of
　a point in time at which the instruction unit instructs a gas supply device to supply gas,
　a point in time at which the instruction unit instructs a welding wire supply device to supply a welding wire,
　a point in time at which the instruction unit notifies the welding power supply device of a command value of current, voltage, or a wire supply speed, or
　a point in time at which the instruction unit notifies the welding power supply device of a welding start signal.

4. The robot control device according to claim 3, wherein the detection sensitivity adjustment unit takes, as the point in time at which the instruction unit instructs the welding power supply device to start welding, a point in time obtained by addition of a correction time to or subtraction of the correction time from any one of
　the point in time at which the instruction unit instructs the gas supply device to supply gas,
　the point in time at which the instruction unit instructs the welding wire supply device to supply the welding wire,
　the point in time at which the instruction unit notifies the welding power supply device of the command value of the current, the voltage, or the wire supply speed, or
　the point in time at which the instruction unit notifies the welding power supply device of the welding start signal.

5. The robot control device according to claim 2, wherein the detection sensitivity adjustment unit takes, as the point in time at which the detection sensitivity adjustment unit recognizes generation of arc discharge, any one of
　a point in time at which the detection sensitivity adjustment unit receives a notification of generation of arc discharge from the welding power supply device, or
　a point in time at which arc discharge has been determined to be generated, based on output values of current and voltage supplied from the welding power supply device to the robot.

6. The robot control device according to claim 5, wherein the detection sensitivity adjustment unit takes, as the point in time at which the detection sensitivity adjustment unit recognizes generation of arc discharge, a point in time obtained by addition of a correction time to any one of
　the point in time at which the detection sensitivity adjustment unit receives the notification of generation of arc discharge from the welding power supply device, or
　the point in time at which arc discharge has been determined to be generated, based on the output values of the current and the voltage supplied from the welding power supply device to the robot.

7. The robot control device according to claim 1, wherein the detection sensitivity adjustment unit takes, as the predetermined standby time,
　a period of time during which the welding power supply device notifies that welding start processing is in progress.

8. A robot control device for controlling operation of a robot that performs welding involving contact with a welding target, comprising:
　an operation stop unit that stops the operation of the robot in a case where it is detected that the robot has received an external force of a threshold or more; and
　a detection sensitivity adjustment unit that decreases a sensitivity of detecting the external force is the operation stop unit until the robot moves in a welding progress direction by a preset distance from a position at which welding by the robot starts.

* * * * *